June 16, 1931.  E. W. KOERING  1,809,854
APPARATUS FOR SHAPING GLASS RODS
Filed June 14, 1927  2 Sheets-Sheet 1

INVENTOR
Eustachius W. Koering
BY
M. J. Reynolds
ATTORNEY

June 16, 1931. E. W. KOERING 1,809,854
APPARATUS FOR SHAPING GLASS RODS
Filed June 14, 1927 2 Sheets-Sheet 2

INVENTOR
Eustachius W. Koering
BY
M. J. Reynolds
ATTORNEY

Patented June 16, 1931

1,809,854

UNITED STATES PATENT OFFICE

EUSTACHIUS W. KOERING, OF VINELAND, NEW JERSEY

APPARATUS FOR SHAPING GLASS RODS

Application filed June 14, 1927. Serial No. 198,727.

This invention relates to a method and apparatus for reshaping glass rods and more particularly to the reshaping of glass rods of relatively large size.

Heretofore it has not been deemed feasible to successfully reshape drawn glass rods of large size, that is rods of a diameter of one-half inch or over, to any appreciable extent due to the extreme difficulty of locally heating the portion to be reshaped to the plastic or semi-plastic stage without fracture of the rod by the expansion strains set up between the heated portion and the adjacent cooler portions.

In the manufacture of glass towel bars and similar objects it has been the usual custom, in accordance with prior practice, to construct the bar of a straight rod of glass supported in posts or brackets extending outwardly from the wall and to taper the ends of the glass rods for reception in the brackets, by abrasion.

The present invention is particularly applicable to the manufacture of glass towel bars, one of the objects being to provide a novel method of reshaping the bars, such as tapering, bending, and the formation of grooves therein or flanges or enlargements thereon.

Another object is to provide a method and apparatus for heating glass rods by which solid rods of relatively large diameter may be locally heated to the plastic stage without fracture thereof.

A further object is to provide a novel method and apparatus for reshaping the plastic rods into any desired form.

Other objects and advantages will hereinafter more fully appear.

In accordance with the present invention the portions of the rods which it is desired to render plastic are subjected to a prolonged and gradually increasing preheat treatment prior to being raised to the plastic temperature, the heating extending beyond the zone to be reshaped in a gradually decreasing temperature gradient of such moderate declivity as to prevent the creation of destructive expansion strains in the glass. This preheating is followed by a more intense local heating which renders the rods plastic at the desired zone, after which they may be bent, distorted or tooled into any desired shape, as will appear more fully hereinafter.

In order that the invention may be more fully understood reference will be had to the accompanying drawings in which.

Figure 1:
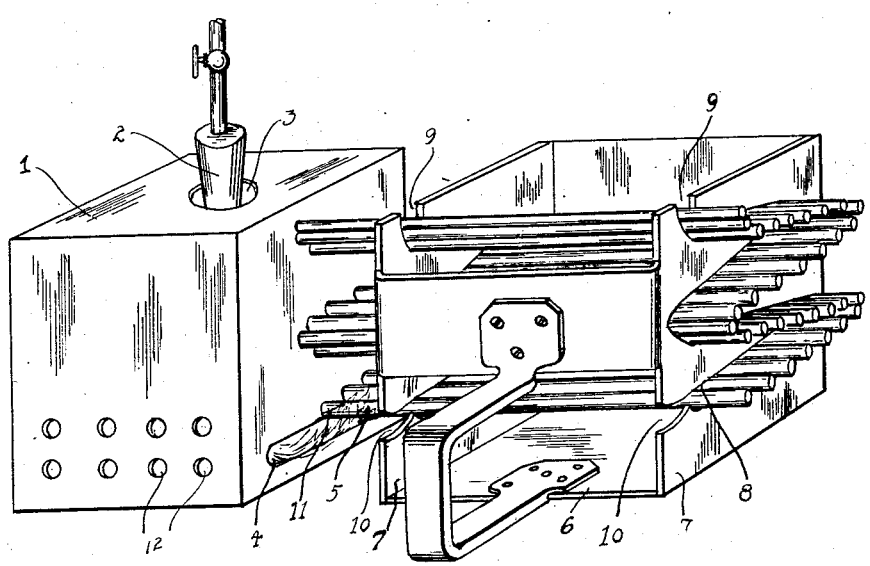
Fig. 1 is a perspective view of the apparatus for heating the rods locally to the plastic state.

The apparatus shown in Fig. 1 comprises a furnace 1, commonly termed a glory hole, having a burner 2 directed into an aperture 3 in the upper side thereof. Adjacent the lower end of the furnace along one face is an elongated opening 4 provided for the egress of heat for preheating the ends of the glass rods 5, preparatory to rendering them plastic. The rods 5 are supported in a frame 6 comprising a pair of spaced side members 7 having a sinuous slide or opening 8 therein down which the rods travel by gravity. The length of the slideway is designed so that the time consumed by the rods in traveling from the entrance 9 to the exit 10 is such as to heat the rods at a sufficiently slow rate to prevent the creation of destructive strains in the glass. The time and extent of the preheating depends on the size of the rods and their composition and can readily be determined by trial. When it is desired to work the rods they are removed from the lower end of the rack or slide and the heated end 11 inserted in one of a series of openings 12 provided in the front side of the furnace. The rods are heated to the plastic state in this position but due to the high and slow preheat treatment to which the rods were previously subjected, extending back from the end in a gradually decreasing temperature gradient, excessive or disruptive strains are not created.

Figure 2:
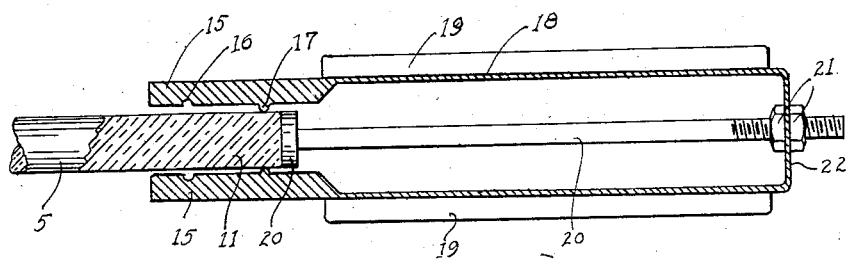
Fig. 2 is a sectional view of the apparatus employed to tool the rod to the desired form.
Figure 3:
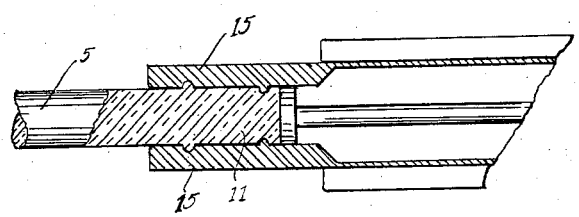
Fig. 3 is a view similar to Figure 2 with the rods completely reshaped.
Figure 4:
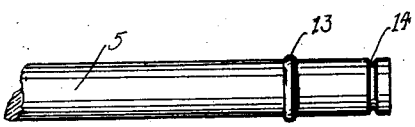
Fig. 4 is an elevation of the reshaped rod.
Figure 6:
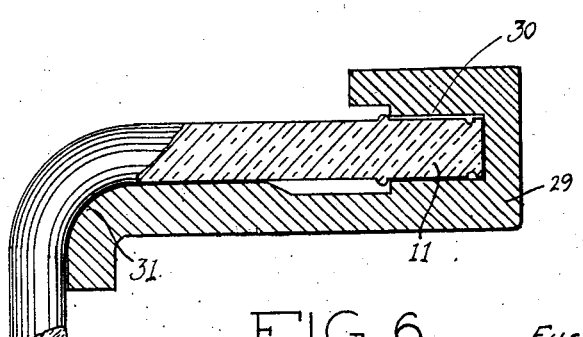

The plastic end of the rod may then be tooled into any desired shape. By way of example, apparatus is illustrated in Figs. 2 and 3 for forming an annular bead 13 and an annular groove 14 on the end of the rod, as shown in Fig. 4. This apparatus comprises a pair of contractile jaws or plates 15 between which the rods 5 are rotated in any desired manner. The jaws or plates 15 are each provided with a groove 16 and ridge 17 which form the complementary configurations on the rod.

The plates 15 are formed integral with a steel spring 18 provided with a wooden portion 19 serving as a hand grip. A guide member 20 is provided to limit and determine the extent of insertion of the glass rod into the jaws and is rendered adjustable by nuts 21 arranged on opposite sides of the end portion 22 of the steel spring 18.

The plastic end 11 of the rod is inserted between the plates 15 and rotated therebetween until they are worked into the desired shape. In place of the bead 13 or groove 14 other forms may be produced by the tooling operation. For the purpose of a towel bar it is necessary to tool both ends. The rods are therefore passed through the rack 6 a second time and the opposite ends heated and reshaped.

Figure 5:
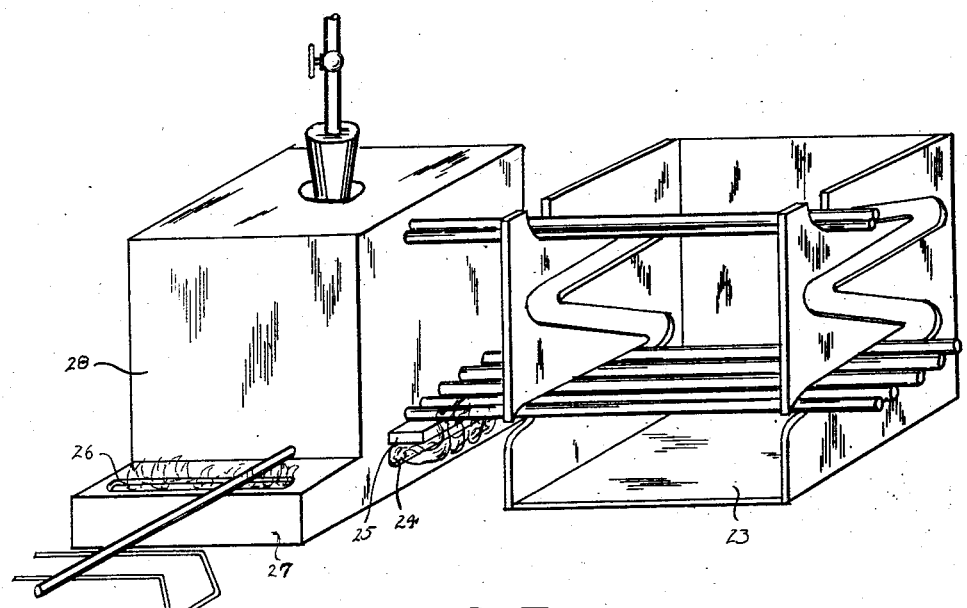
Fig. 5 is a perspective view of the apparatus of Fig. 1 viewed from the opposite side showing the manner of heating the bars at a zone intermediate their ends; and, Fig. 6 is a sectional view of an apparatus for bending the bars.

In Fig. 5 I have shown an apparatus for locally heating the rods intermediate their ends. For this purpose the remaining two sides of the furnace of Fig. 1 may be employed or a separate furnace may be used. The rods are passed slowly down a rack 23 similar to rack 6 and the ends slowly preheated from the aperture 24 in the lower end of the furnace. In order to distribute the heat over a zone spaced from the end of the rod, a shelf or baffle 25 projects outwardly from the furnace above the opening 24 and protects the ends of the bars from the direct action of the flames, which are caused to strike the bars at the required distance from the ends, the heat gradually decreasing along the bar adjacent the zone it is desired to reshape. After the preheating is completed the rods are disposed over a second opening 26 arranged in the upper side of a box-like projection 27 of the furnace. The opening 26 is spaced a distance from the side 28 of the furnace so that the zone to be heated may be placed directly over the opening and be heated to the working temperature without heating of the end portion. The bar may then be bent or otherwise distorted at the heated zone.

By way of illustration only, I have shown an apparatus which may serve as a guide for bending the bars at the heated zone. This apparatus comprises a plate 29 having one end bent to form a U-shaped channel 30. The opposite end of the plate has a curved face 31 corresponding with the curvature which it is desired to impart to the bar. As will be evident, it is only necessary to insert the tooled end 11 of the bar in the channel 30 and bend the bar about the curved face 31. Obviously, any other suitable apparatus for assisting in the uniform bending of the bar may be employed.

It will be obvious to those skilled in the art that many changes and modifications may be made in the apparatus shown for carrying out the present invention without departing from the invention and I do not desire to be limited to the exact details shown and described, except in accordance with the appended claims.

What is claimed is:

1. Apparatus for heating glass rods of large diameter without setting up disruptive strains therein, comprising a furnace having an opening in one side thereof for the exit of heat, and gravity conveyor for progressively and slowly passing said rods from a point of low temperature to a point of high temperature.

2. Apparatus for heating glass rods of large diameter without setting up disruptive strains therein, comprising a furnace having an opening in one side thereof for the exit of heat, and a rack for supporting said rods with the portion thereof to be heated adjacent the furnace, said rack having a guideway therein for permitting the rods to pass by gravity from a position remote from the furnace opening to a position opposite thereto.

3. Apparatus for heating glass rods of large diameter without setting up disruptive strains therein, comprising a furnace having an opening in one side thereof for the exit of heat, and a rack for supporting said rods with the portion thereof to be heated adjacent the furnace, said rack having a guideway therein for permitting the rods to pass by gravity from a position remote from the furnace opening to a position opposite thereto and means associated with said furnace for protecting from heat certain portions of said rods.

4. Apparatus for heating glass rods of large diameter without setting up disruptive strains therein, comprising a furnace having an opening in one side thereof for the exit of heat, and a rack for supporting said rods with the portion thereof to be heated adjacent the furnace, said rack having a guideway therein for permitting the rods to pass by gravity from a position remote from the furnace opening to a position opposite thereto and means associated with said furnace for directing the heat on desired portions of said rods.

5. Apparatus for locally heating glass rods to the plastic state comprising a furnace having an opening in a sidewall thereof for the exit of heat, means for passing said rods from a position remote from said opening to a position adjacent thereto through progressively increasing temperature zones to gradually heat the rods to near the plastic state over a substantial portion thereof and a baffle disposed above said opening for deflecting said heat to a portion of said rods spaced from the ends thereof.

In testimony whereof, I have hereunto subscribed my name this 22nd day of April, 1927.

EUSTACHIUS W. KOERING.